(12) United States Patent
Takahashi (10) Patent No.: US 11,901,632 B2
(45) Date of Patent: Feb. 13, 2024

(54) PHASED ARRAY ANTENNA DEVICE AND PROGRAM

(71) Applicant: Mitsubishi Electric Corporation, Tokyo (JP)

(72) Inventor: Tomohiro Takahashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 299 days.

(21) Appl. No.: 17/605,231

(22) PCT Filed: Mar. 26, 2020

(86) PCT No.: PCT/JP2020/013723
§ 371 (c)(1),
(2) Date: Oct. 21, 2021

(87) PCT Pub. No.: WO2020/255522
PCT Pub. Date: Dec. 24, 2020

(65) Prior Publication Data
US 2022/0200161 A1   Jun. 23, 2022

(30) Foreign Application Priority Data
Jun. 20, 2019   (JP) ................. 2019-114250

(51) Int. Cl.
*H01Q 21/06*   (2006.01)
*H01Q 3/36*   (2006.01)
(Continued)

(52) U.S. Cl.
CPC ............ *H01Q 21/06* (2013.01); *G01S 3/42* (2013.01); *H01Q 3/2605* (2013.01); *H01Q 3/36* (2013.01); *H01Q 21/24* (2013.01)

(58) Field of Classification Search
CPC .......... H01Q 21/06; H01Q 3/36; H01Q 21/24; H01Q 3/2605; G01S 3/42
(Continued)

(56) References Cited

U.S. PATENT DOCUMENTS 9,160,430 B2 * 10/2015 Maltsev ............... H04B 7/0885
10,211,527 B2 * 2/2019 Safavi-Naeini ........ H01Q 3/267

FOREIGN PATENT DOCUMENTS

JP   4-242302 A   8/1992
JP   7-321536 A   12/1995
(Continued)

OTHER PUBLICATIONS

Office Action dated Jul. 19, 2022, issued for the corresponding Jp patent application No. 2021-527383 and the English translation, 4 pp.
(Continued)

*Primary Examiner* — Khai M Nguyen
(74) *Attorney, Agent, or Firm* — XSENSUS LLP (57) ABSTRACT

A phased array antenna device for receiving a signal from a satellite includes subarrays including antenna elements and phase shifters that shift phases of signals received by the antenna elements with set phase shift values, a demodulator that demodulates the signals from the satellite with the phases shifted by the phase shifters and outputs the demodulated signals, and a controller that sets the phase shift values of the phase shifters and controls a beam direction. The controller calculates, for each of the subarrays, a direction-correction phase shift value that maximizes a power value of the signal from the satellite by being added to the phase shift values of the phase shifters included in the subarray and adds the direction-correction phase shift value to the phase shift values of the phase shifters included in the subarray.

11 Claims, 9 Drawing Sheets

(51) Int. Cl.
*H01Q 21/24* (2006.01)
*H01Q 3/26* (2006.01)
*G01S 3/42* (2006.01)

(58) Field of Classification Search
USPC .......................................................... 343/702
See application file for complete search history.

(56) References Cited

FOREIGN PATENT DOCUMENTS

| | | |
|---|---|---|
| JP | 2000-299655 A | 10/2000 |
| JP | 2014-3431 A | 1/2014 |

OTHER PUBLICATIONS

International Search Report and Written Opinion dated Jun. 30, 2020, received for PCT Application PCT/JP2020/013723, Filed on Mar. 26, 2020, 8 pages including English Translation.

* cited by examiner

PHASED ARRAY ANTENNA DEVICE AND PROGRAM

CROSS-REFERENCE TO RELATED APPLICATIONS

The present application is based on PCT filing PCT/JP2020/013723, filed Mar. 26, 2020, which claims priority to JP 2019-114250, filed Jun. 20, 2019, the entire contents of each are incorporated herein by reference.

TECHNICAL FIELD

The present disclosure relates to a phased array antenna device and a program.

BACKGROUND ART

A device such as an elliptic reflector or a horn array antenna has been used for height reduction in satellite communications for mobile objects such as an aircraft, a vessel, and an automobile. Growing semiconductor technologies have enabled integration of, for example, an amplifier and a phase shifter into a small circuit at low cost. Such integrated circuits have enabled fabrication of low-cost, low-height, and high-performance phased array antennas that can be used in satellite communications for mobile objects.

To use phased array antennas in satellite communications for mobile objects, accurate and stable satellite tracking is to be performed for stable communications. Satellite tracking with a phased array antenna mounted on a mobile object typically involves directing the antenna toward the satellite with beam scanning based on, for example, various items of sensor information about the mobile object and information about the satellite to be a communication target. However, this method causes power reduction in received signals resulting from errors in, for example, sensor information or antenna directivity. In particular, a system with high frequencies uses a large antenna and a narrow beam width, and thus increases power reduction in received signals resulting from these errors.

Patent Literature 1 describes a tracking antenna device including multiple antennas directed toward a satellite. Each antenna includes a feedback system to compensate for a phase shift between the antennas with a feedback signal to decrease power reduction.

Another satellite tracking method described in Patent Literature 2 includes directing, with a communication satellite (CS) communication system, an antenna toward a satellite by repeatedly controlling the direction of the antenna while tracking the peak of a carrier-to-noise ratio (C/N ratio) of a control channel until the antenna appropriately receives a radio wave from an intended satellite.

CITATION LIST

Patent Literature

Patent Literature 1: Unexamined Japanese Patent Application Publication No. 2014-3431
Patent Literature 2: Unexamined Japanese Patent Application Publication No. 2000-299655

SUMMARY OF INVENTION

Technical Problem

However, hardware that generates feedback signals may be used in a feedback system combining the technology described in Patent Literature 1 with a phased array antenna device that tracks a satellite by directing an antenna toward the satellite with beam scanning based on, for example, various items of sensor information about the mobile object and information about the satellite to be a communication target. The system thus involves, for example, a complex layout of components, more components, and higher cost. The satellite tracking method described in Patent Literature 2 may have greater power fluctuations in the peak search of the C/N ratio with a larger antenna size and a smaller beam width, causing less stable communications during the peak search of the C/N ratio.

In response to the above issue, an objective of the disclosure is to provide a phased array antenna device for receiving a signal from a satellite that enables a stable satellite communication in a simple manner.

Solution to Problem

To achieve the above objective, a phased array antenna device for receiving a signal from a satellite includes a plurality of subarrays, a demodulator, and a controller. Each of the plurality of subarrays includes a plurality of antenna elements and a plurality of phase shifters, each of the plurality of phase shifters being connected to a corresponding antenna element included in the plurality of antenna elements. Each of the plurality of phase shifters shifts phase of signal received by the corresponding antenna element with set phase shift value. The demodulator demodulates the signals from the satellite with the phases shifted by the plurality of phase shifters and outputs the demodulated signals. The controller sets the phase shift values of the plurality of phase shifters and controls a beam direction. The controller, for each of the plurality of subarrays, (i) calculates a direction-correction phase shift value that maximizes a power value of the signal from the satellite by being added to the phase shift values of the plurality of phase shifters, and (ii) adds the direction-correction phase shift value to the phase shift values of the plurality of phase shifters.

Advantageous Effects of Invention

The phased array antenna device for receiving a signal from a satellite according to the above aspect of the present disclosure enables stable satellite communications by simply correcting the beam direction to a direction toward the satellite based on a power value of signals from a satellite.

DESCRIPTION OF EMBODIMENTS

A phased array antenna device according to one or more embodiments and a program that implements the phased array antenna device is described in detail with reference to the drawings. In the figures, the same or corresponding components are given the same reference numerals. The phased array antenna device according to one or more embodiments described below is mounted on a mobile object to track a satellite with beam scanning and receive signals from the satellite.

Embodiment 1

Figure 1:
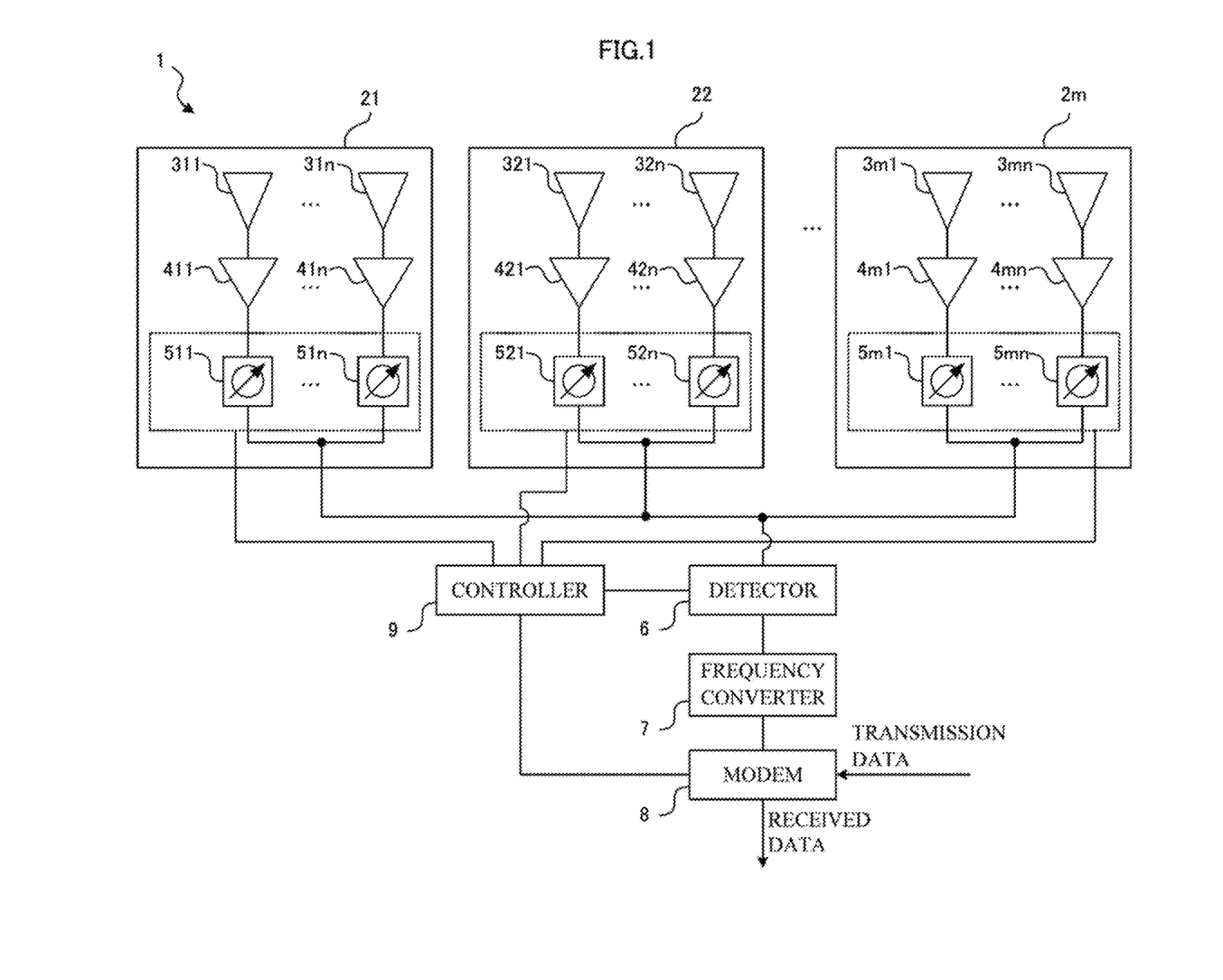
FIG. 1 is a schematic diagram of an example phased array antenna device according to Embodiment 1.

FIG. 1 is a schematic diagram of an example phased array antenna device 1 according to Embodiment 1. The phased array antenna device 1 includes m subarrays 21, 22, through 2m that transmit and receive signals, a detector 6 that extracts signals from the satellite and detects power of the signals, a frequency converter 7 that converts the frequency of signals inputted thereto, a modulator-demodulator (modem) 8 that modulates or demodulates the signals inputted thereto, and a controller 9 that controls a direction of a beam.

The subarray 21 includes n antenna elements 311 to 31n, n amplifiers 411 to 41n, and n phase shifters 511 to 51n. The subarray 22 includes n antenna elements 321 to 32n, n amplifiers 421 to 42n, and n phase shifters 521 to 52n. The subarray 2m includes n antenna elements 3m1 to 3mn, n amplifiers 4m1 to 4mn, and n phase shifters 5m1 to 5mn. Here, m and n are natural numbers.

The subarrays 21, 22, through 2m may hereafter be collectively referred to as subarrays 2. The antenna elements 311 to 31n, 321 to 32n, and 3m1 to 3mn may be referred to as antenna elements 3. The amplifiers 411 to 41n, 421 to 42n, and 4m1 to 4mn may be referred to as amplifiers 4. The phase shifters 511 to 51n, 521 to 52n, and 5m1 to 5mn may be referred to as phase shifters 5.

Each antenna element 3 is connected to a corresponding one of the amplifiers 4. Each amplifier 4 is connected to a corresponding one of the phase shifters 5. Each phase shifter 5 is connected to the detector 6. The detector 6 is connected to the frequency converter 7. The frequency converter 7 is connected to the modem 8. The phase shifters 5 in each subarray 2, the detector 6, and the modem 8 are connected to the controller 9.

Figure 2:
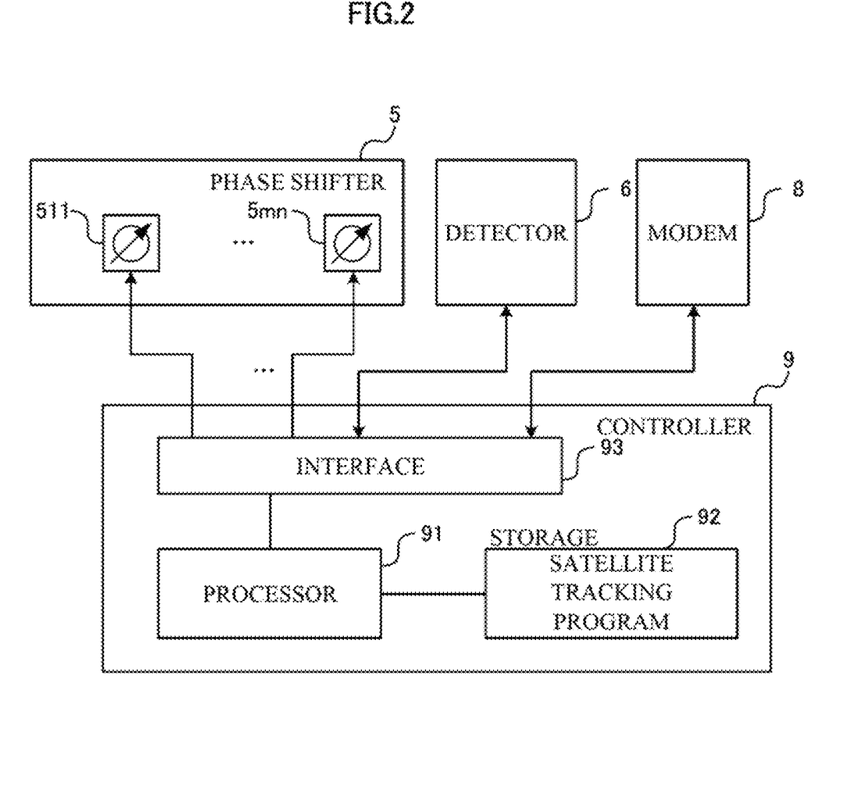
FIG. 2 is a block diagram of a controller illustrated in FIG. 1.

The controller 9 controls the operations of the phased array antenna device 1. In the present embodiment, the controller 9 controls, particularly, a phase shift value of each phase shifter 5 to cause, with an application program, the phased array antenna device 1 to track a satellite as a communication target. As illustrated in FIG. 2, the controller 9 includes a processor 91 that performs a control process, a storage 92 that stores an operation program of the processor 91, and an interface 93 that sets the phase shift amount instructed by the processor 91 to each phase shifter 5. The storage 92 stores a satellite tracking program as an example of the operation program. The processor 91 executes the satellite tracking program to implement a satellite tracking process (described below with reference to FIG. 4) with software processing. The processor 91 is an example of a computer.

Figure 3A:
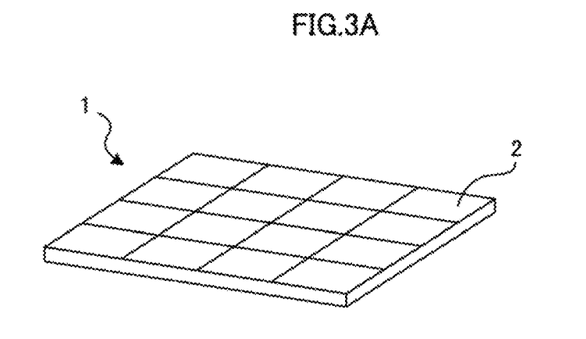
FIG. 3A is a perspective view of an example phased array antenna device according to Embodiment 1.
Figure 3B:
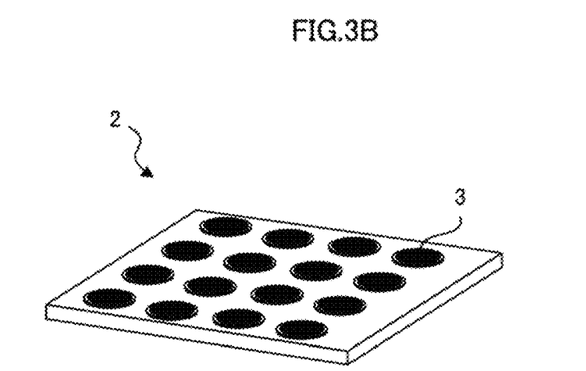
FIG. 3B is a perspective view of an example subarray of the phased array antenna device according to Embodiment 1.

Them subarrays 21 to 2m included in the phased array antenna device 1 are arranged in, for example, a matrix as illustrated in FIG. 3A. In FIG. 3A, the subarrays 2 are arranged in a 4×4 matrix, and m=16. As illustrated in FIG. 3B, each of the subarrays 2 includes n antenna elements 3. In the example in FIG. 3B, the antenna elements 3 are arranged in a 4×4 matrix, and n=16. In the example illustrated in FIGS. 3A and 3B, the number of antenna elements 3 is n×m=16×16=256. In the example described below, the number m of subarrays 2 included in the phased array antenna device 1 is 16, and the number n of antenna elements 3 included in each subarray 2 is 16.

The operation of the phased array antenna device 1 to receive signals from a satellite is described. Each antenna element 3 receives a radio wave. The radio wave received by each antenna element 3 includes a carrier signal including data transmitted from the satellite. The signal of the radio wave received by each antenna element 3 undergoes a phase shift in the phase shifter 5. The resultant signals are synthesized and input into the detector 6. The detector 6 extracts a signal from the satellite out of the synthesized signal to output the signal to the frequency converter 7. A phase shift value set to each phase shifter 5 is described later. The frequency converter 7 converts the frequency of the signal inputted thereto to a lower frequency that is lower than the frequency. The frequency converter 7 converts, for example, a radio frequency (RF) signal to an intermediate frequency (IF) signal. The modem 8 demodulates the signal converted to a lower frequency signal by the frequency converter 7, and outputs received data. The modem 8 is an example of a demodulator.

The operation of the phased array antenna device 1 to transmit signals to a satellite is described. The modem 8 modulates transmission data generated by a non-illustrated signal generator. The modem 8 is an example of a modulator. The frequency converter 7 converts, for example, the frequency of a signal modulated by the modem 8 to a frequency F2 approximate to a frequency F1 of the signal from the satellite. The signal with the frequency converted to the frequency F2 by the frequency converter 7 is distributed to each phase shifter 5. Each phase shifter 5 shifts the phase of the signal inputted thereto with a phase shift value set by the controller 9. Each amplifier 4 amplifies the signal with the phase shifted by the corresponding phase shifter 5 with a set amplification factor. Each antenna element 3 radiates the signal amplified by the corresponding amplifier 4 into a space with a radio wave. The radio wave radiated from each antenna element 3 forms a beam in a directing direction of the antenna element 3. The direction in which the beam travels is hereafter referred to as a beam direction.

The operation of the phased array antenna device 1 to initially set the beam direction is described. Upon identifying a satellite as a communication target, the controller 9 performs initial tracking to track the communication target satellite by controlling a directing direction of the phased array antenna device 1 based on, for example, position information about a mobile object on which the phased array antenna device 1 is mounted and information about an orbit of the satellite. The initial tracking of the satellite is performed by a known technology. The controller 9 sets, to each phase shifter 5, a phase shift value for setting the direction toward the initially-tracked satellite to the beam direction. Matching in the beam direction and the direction toward the satellite maximizes the gain of the antenna element 3.

As the mobile object on which the phased array antenna device 1 is mounted and the satellite move, the beam direction deviates from the direction toward the satellite. Thus, the phased array antenna device 1 corrects the beam direction and tracks the satellite. The operation of the phased array antenna device 1 to correct the beam direction is described. The detector 6 detects power of the signal from the satellite. The detector 6 transmits data indicating a detected power value to the controller 9. Based on the data received from the detector 6, the controller 9 calculates, with an array antenna calibration method such as a rotating element electric field vector method, a direction-correction phase shift value to be added to phase shift values of the phase shifters 5 for each subarray 2 to correct deviation of the beam direction from the direction toward the satellite. The direction-correction phase shift value is an example of a correction phase shift value.

With the rotating element electric field vector method, the controller 9 consecutively adds phase shift values ranging from 0 to 360 degrees to the phase shift values set to the phase shifters 5 for each subarray 2. The controller 9 consecutively adds the same phase shift value $P_{add}$ ranging from 0 to 360 degrees to the phase shift values set to all the phase shifters 5 included in the subarray 2 to undergo addition of phase shift values. The controller 9 sequentially performs the process of adding the phase shift value $P_{add}$ on the subarrays 2. More specifically, the controller 9 selects the subarrays 2 one by one to consecutively add the same phase shift value $P_{add}$ ranging from 0 to 360 degrees to the phase shift values set to the 16 phase shifters 5 included in each subarray 2. During this operation, the controller 9 does not add the phase shift value $P_{add}$ to the phase shift values set to the phase shifters 5 included in the other subarrays 2. In one example, the same phase shift value $P_{add}$ ranging from 0 to 360 degrees is added in increments of $\Delta\theta$ or, for example, 0.5 degrees to the phase shift values set in the initial tracking to the 16 phase shifters 5 in the subarray 21. During this operation, the phase shift value add is P not added to the phase shift values set to the phase shifters 5 included in the other subarrays 22 to 2m. After the process on the subarray 21 is complete, the phase shift values of the 16 phase shifters 5 in the subarray 21 are returned to the phase shift values set in the initial tracking, and the same phase shift value $P_{add}$ ranging from 0 to 360 degrees is then added in increments of $\Delta\theta$ to the phase shift values set in the initial tracking to the 16 phase shifters 5 in the subarray 22. During this operation, the phase shift value $P_{add}$ is not added to the phase shift values set to the phase shifters 5 included in the other subarrays 21 and 23 to 2m.

The controller 9 calculates the phase shift value $P_{add}$ that maximizes the power value of the signal from the satellite based on the data indicating the power value of the signal from the satellite detected by the detector 6 while the phase shift values $P_{add}$ ranging from 0 to 360 degrees are consecutively added in increments of $\Delta\theta$ to the phase shift values of the phase shifters 5 in each subarray 2. The direction in which the power value of the signal from the satellite is maximum is the direction toward the satellite. Thus, the phase shift value Paid that maximizes the power value of the signal from the satellite is calculated as a direction-correction phase shift value that corrects deviation of the beam direction from the direction toward the satellite by being added to the phase shift values of the phase shifters 5. For the beam direction without deviation from the direction toward the satellite, the direction-correction phase shift value is 0.

The operation with the rotating element electric field vector method has been described above. The rotating element electric field vector method is described in detail in, for example, Mano and Katagi, "A method for measuring amplitude and phase of each radiating element of a phased array antenna," the Institute of Electronics, Information and Communication Engineers. Journal B, Vol. J65-B, No. 5, pp. 555-560, May 1982.

The controller 9 monitors the C/N ratio of the signal from the satellite in the modem 8 or more specifically the quality of the received signal, and determines whether the antenna elements 3 receive a signal from the satellite with a C/N ratio that is larger than or equal to a threshold. The C/N ratio may be calculated by the modem 8 or the controller 9. When the antenna elements 3 receive a signal from the satellite with a C/N ratio that is larger than or equal to the threshold, the controller 9 adds a direction-correction phase shift value to the phase shift values of the phase shifters 5 in each subarray 2. The same direction-correction phase shift value is added to the phase shift values of the phase shifters 5 in each subarray 2. The controller 9 calculates the direction-correction phase shift value for each subarray 2, and repeats the process of adding the direction-correction phase shift value to the phase shift values of the phase shifters 5 in each subarray 2 with each beam update period to correct the beam direction to the direction toward the satellite. The beam update period may be set in advance, or set by a user.

When, for example, a communication target satellite is a stationary satellite without switching to another satellite and a posture change of the mobile object falls within a range correctable with the direction-correction phase shift value, the controller 9 may eliminate the process of determining whether the antenna elements 3 receive a signal from the satellite with a C/N ratio that is larger than or equal to a threshold.

Figure 4:
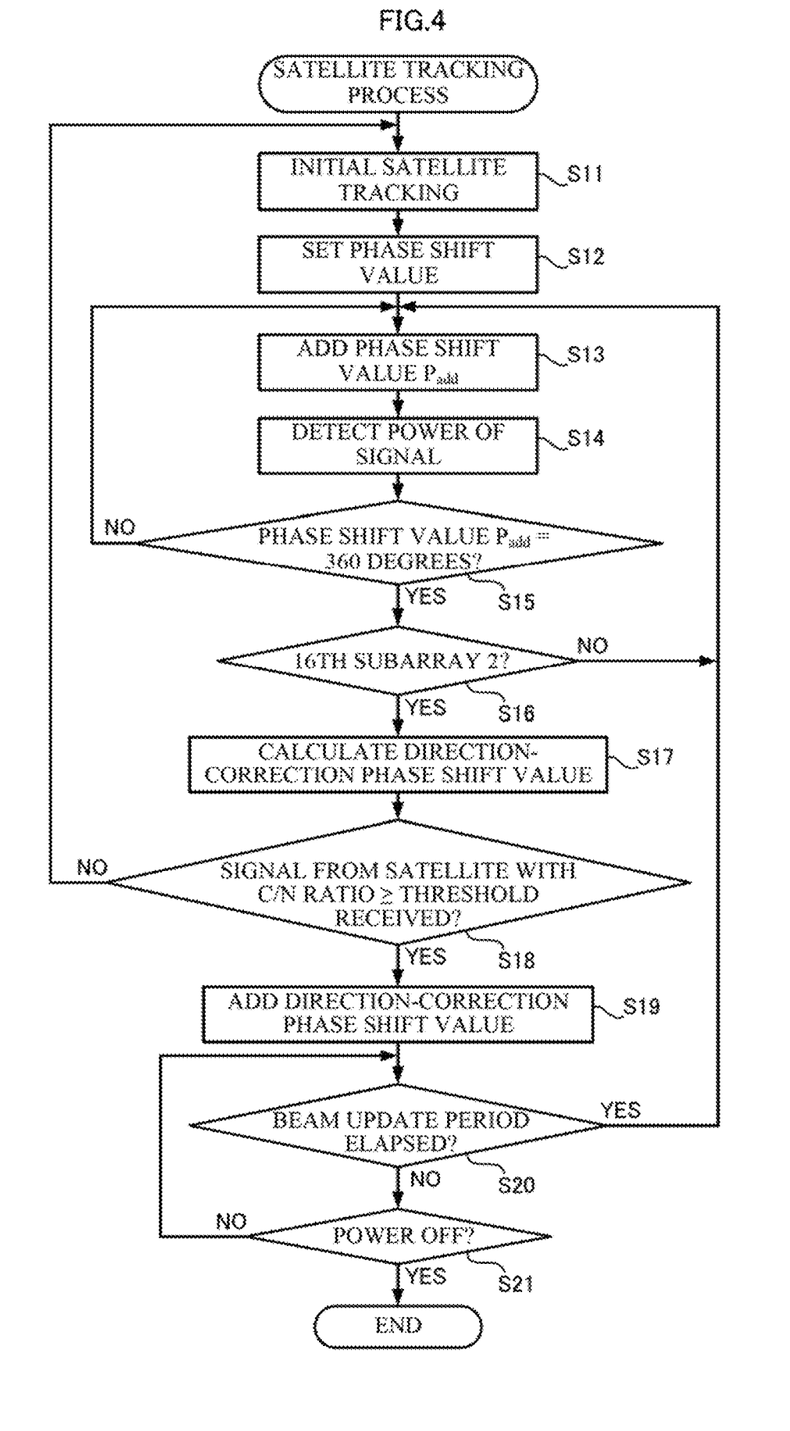
FIG. 4 is a flowchart illustrating a satellite tracking process performed by the phased array antenna device according to Embodiment 1.

The overall operation in the satellite tracking process performed by the phased array antenna device 1 is described with reference to FIG. 4. The satellite tracking process illustrated in FIG. 4 starts when the phased array antenna device 1 is powered on.

Upon identifying the communication target satellite, the controller 9 performs the initial tracking to determine the direction toward the communication target satellite based on, for example, position information about the mobile object on which the phased array antenna device 1 is mounted and information about an orbit of the satellite (step S11). The controller 9 sets, to each of 256 phase shifters 5, the phase shift value with which the directing direction of the phased array antenna device 1 matches the direction determined in the initial tracking, or more specifically, with which the phased array antenna device 1 faces the calculated satellite position (step S12).

The controller 9 adds the phase shift value add of $P_{add}$ of 0 degrees to the phase shift values set to the 16 phase shifters 5 included in a first subarray 2 (step S13). The detector 6 detects power of the signal from the satellite (step S14). The detector 6 transmits data indicating the detected power value to the controller 9.

When the phase shift value add is $P_{add}$ is not 360 degrees (NO in step S15), the process returns to step S13 to add an increment $\Delta\theta$ to the phase shift value $P_{add}$, and steps S13 to S15 are repeated. When the phase shift value $P_{add}$ reaches 360 degrees (YES in step S15), the determination is performed as to whether the subarray 2 including the phase shifters 5 with the phase shift value $P_{add}$ added to the phase shift values is the 16th subarray 2 (step S16). When the subarray 2 is not the 16th subarray 2 (NO in step S16), the process returns to step S13, and steps S13 to S15 are repeated on the subsequent subarray 2.

When the subarray 2 including the phase shifters 5 with the phase shift value $P_{add}$ added to the phase shift values is the 16th subarray 2 (YES in step S16), the controller 9 calculates, for each subarray 2, based on data indicating the power value of the signal from the satellite detected by the detector 6, the phase shift value $P_{add}$ that maximizes the power value of the signal from the satellite, as the direction-correction phase shift value that corrects deviation of the beam direction from the direction toward the satellite by being added to the phase shift values of the phase shifters 5 (step S17).

The controller 9 monitors the C/N ratio of the signal from the satellite in the modem 8, and determines whether the antenna elements 3 receive a signal from the satellite with a C/N ratio that is larger than or equal to a threshold (step S18). When the antenna elements 3 do not receive the signal from the satellite with the C/N ratio that is larger than or equal to the threshold (NO in step S18), the process returns to step S11, and steps S11 to S18 are repeated. When the antenna elements 3 receive the signal from the satellite with the C/N ratio that is larger than or equal to the threshold (YES in step S18), the controller 9 adds the direction-correction phase shift value to the phase shift values of the phase shifters 5 in each subarray 2 (step S19). More specifically, the controller 9 adds the direction-correction phase shift value to the phase shift value of each phase shifter 5 while the phased array antenna device 1 remains communicating with the communication target satellite to correct deviation of the beam direction from the direction toward the satellite.

When the beam update period has not elapsed (NO in step S20) and the phased array antenna device 1 is not powered off (NO in step S21), steps S20 and S21 are repeated until the beam update period elapses. Before the beam update period elapses, the phased array antenna device 1 receives signals from the satellite, and transmits signals to the satellite. When the beam update period elapses (YES in step S20), the process returns to step S13, and steps S13 to S20 are repeated. When the phased array antenna device 1 is powered off (YES in step S21), the process ends.

As described above, the phased array antenna device 1 for receiving a signal from the satellite according to Embodiment 1 enables stable satellite communications by simply correcting the beam direction to the direction toward the satellite based on the power value of the signal from the satellite and the C/N ratio of the signal from the satellite.

Embodiment 2

In Embodiment 1, the detector 6 extracts a signal from the satellite and detects power of the signal. In Embodiment 2, the detector 6 extracts a signal from the satellite out of signals with the frequency converted to the lower frequency by the frequency converter 7, and detects power of the signal.

Figure 5:
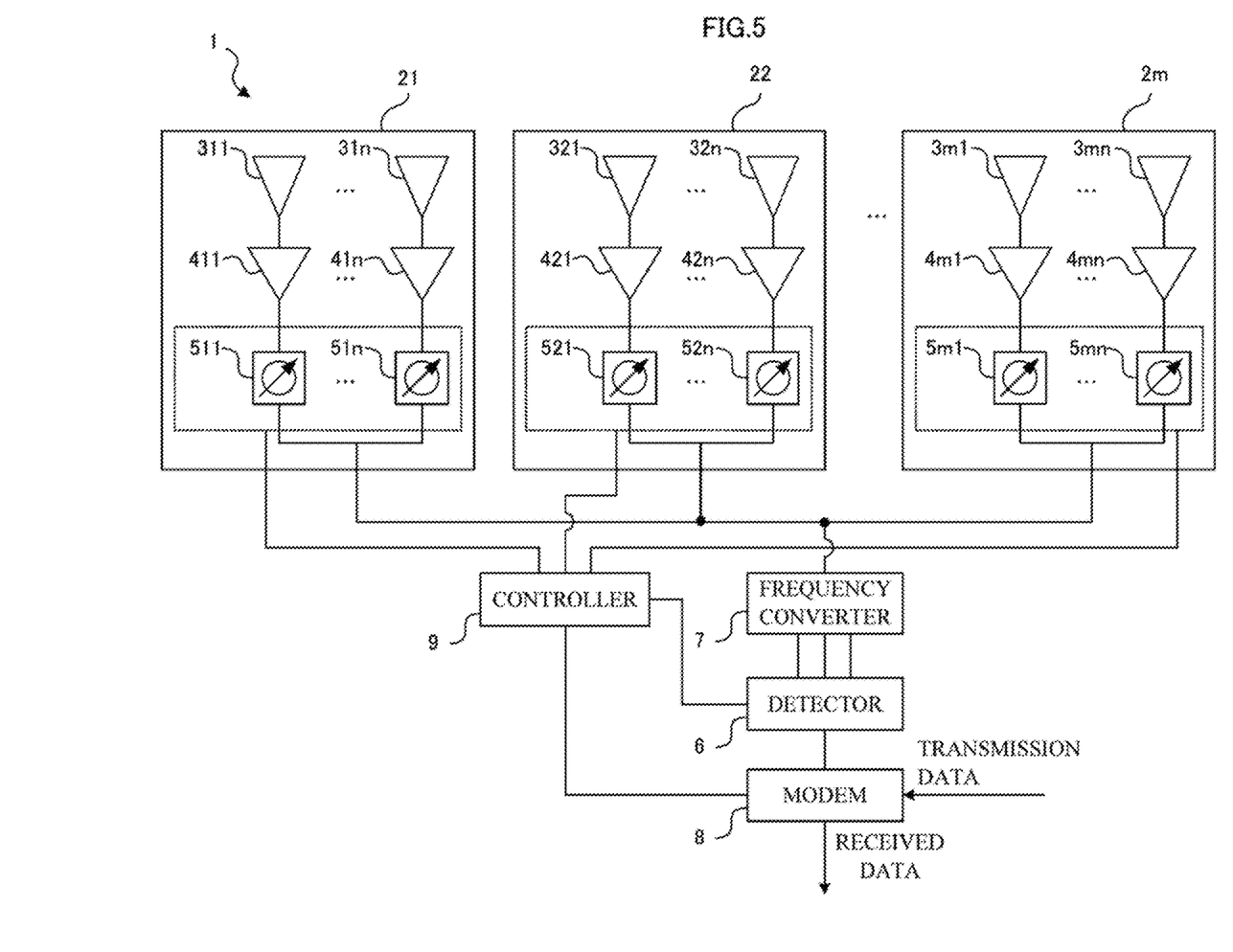
FIG. 5 is a schematic diagram of an example phased array antenna device according to Embodiment 2.

FIG. 5 is a schematic diagram of an example phased array antenna device 1 according to Embodiment 2. The frequency converter 7 converts the frequency of a signal formed by synthesizing signals received by the antenna elements 3 to a lower frequency that is lower than the frequency. The frequency converter 7 converts, for example, an RF signal to an IF signal. The detector 6 extracts a signal from the satellite out of signals with a frequency converted to the lower frequency by the frequency converter 7, and detects power of the signal. More specifically, the controller 9 calculates the direction-correction phase shift value with an array antenna calibration method such as a rotating element electric field vector method based on data indicating the power value of the signal from the satellite with the frequency converted to the lower frequency received from the detector 6. Other processes are the same as in Embodiment 1.

As described above, the phased array antenna device 1 for receiving a signal from the satellite according to Embodiment 2 enables stable satellite communications by simply correcting the beam direction to the direction toward the satellite based on the power value of the signal from the satellite and the C/N ratio of the signal from the satellite.

Embodiment 3

In Embodiments 1 and 2, the controller 9 calculates the direction-correction phase shift value based on the data indicating power value of the signal from the satellite received from the detector 6. In Embodiment 3, the controller 9 calculates the direction-correction phase shift value based on the C/N ratio in the modem 8.

Figure 6:
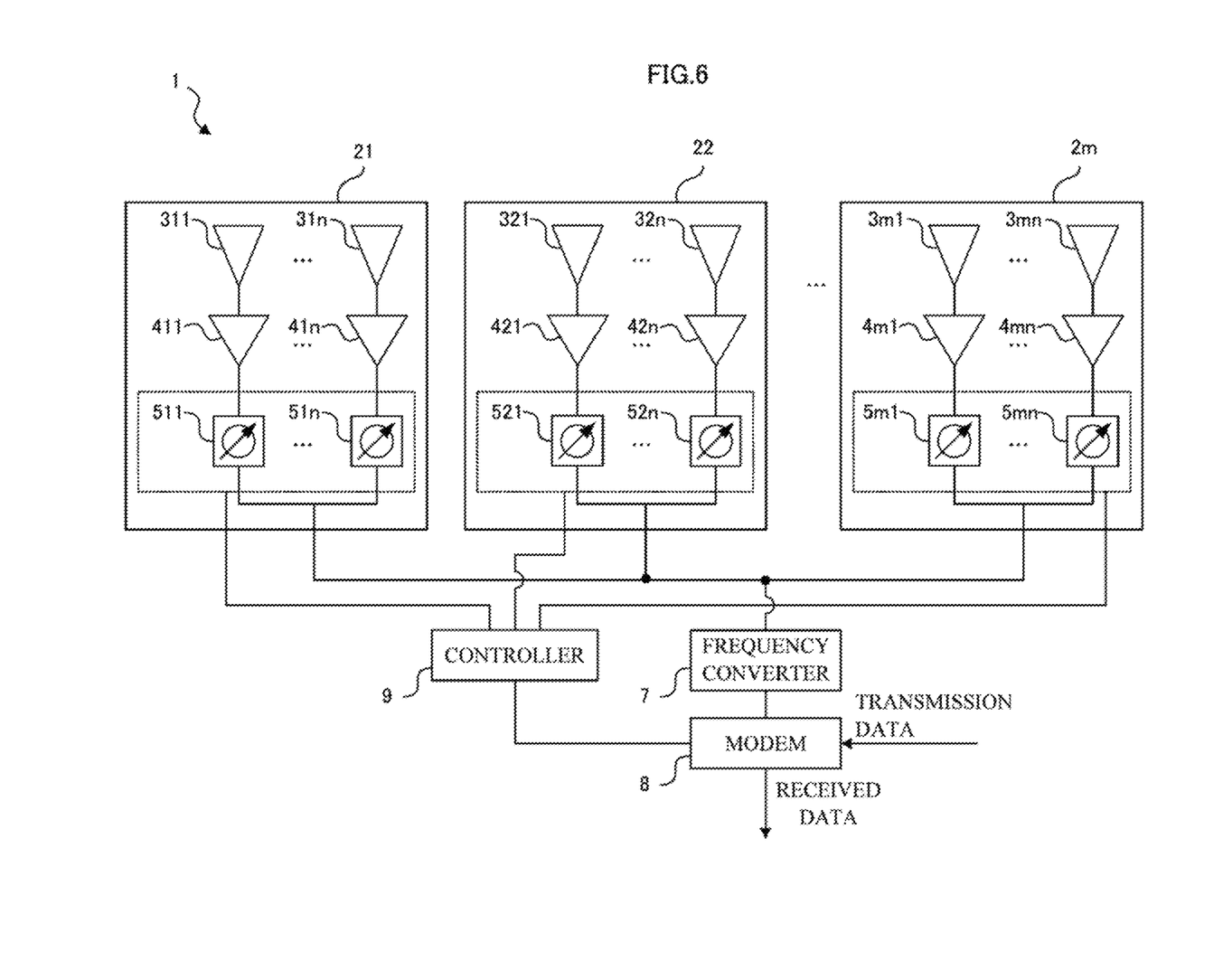
FIG. 6 is a schematic diagram of an example phased array antenna device according to Embodiment 3.

FIG. 6 is a schematic diagram of an example phased array antenna device 1 according to Embodiment 3. The frequency converter 7 converts the frequency of a signal formed by synthesizing the signals from the satellite received by the antenna elements 3 to the lower frequency. The frequency converter 7 converts, for example, an RF signal to an IF signal. The modem 8 demodulates the signal with the frequency converted to the lower frequency by the frequency converter 7, and outputs the demodulated signal. The controller 9 monitors the C/N ratio of the signal from the satellite in the modem 8, and calculates the direction-correction phase shift value based on the C/N ratio with an array antenna calibration method such as a rotating element electric field vector method.

With the rotating element electric field vector method, the controller 9 monitors the C/N ratio of the signal from the satellite in the modem 8 while the phase shift values $P_{add}$ ranging from 0 to 360 degrees are consecutively added to the phase shift values of the phase shifters 5 in each subarray 2, and calculates the phase shift value $P_{add}$ that maximizes the C/N ratio. The direction in which the C/N ratio of the signal from the satellite is maximum is the direction toward the satellite. Thus, the phase shift value $P_{add}$ that maximizes the C/N ratio is calculated as the direction-correction phase shift value that corrects deviation of the beam direction from the direction toward the satellite by being added to the phase shift values of the phase shifters 5. In other words, the phased array antenna device 1 according to Embodiment 3 may eliminate the detector 6. Other processes are the same as in Embodiments 1 and 2.

As described above, the phased array antenna device 1 for receiving a signal from the satellite according to Embodiment 3 enables stable satellite communications by correcting the beam direction to the direction toward the satellite based on the power value of the signal from the satellite and the C/N ratio of the signal from the satellite. The phased array antenna device 1 that may eliminate the detector 6 can reduce costs.

Embodiment 4

In Embodiments 1 to 3, the direction toward the satellite is tracked. In Embodiment 4, in addition to the direction toward the satellite, the polarization plane of the signal from the satellite is tracked.

Figure 7:
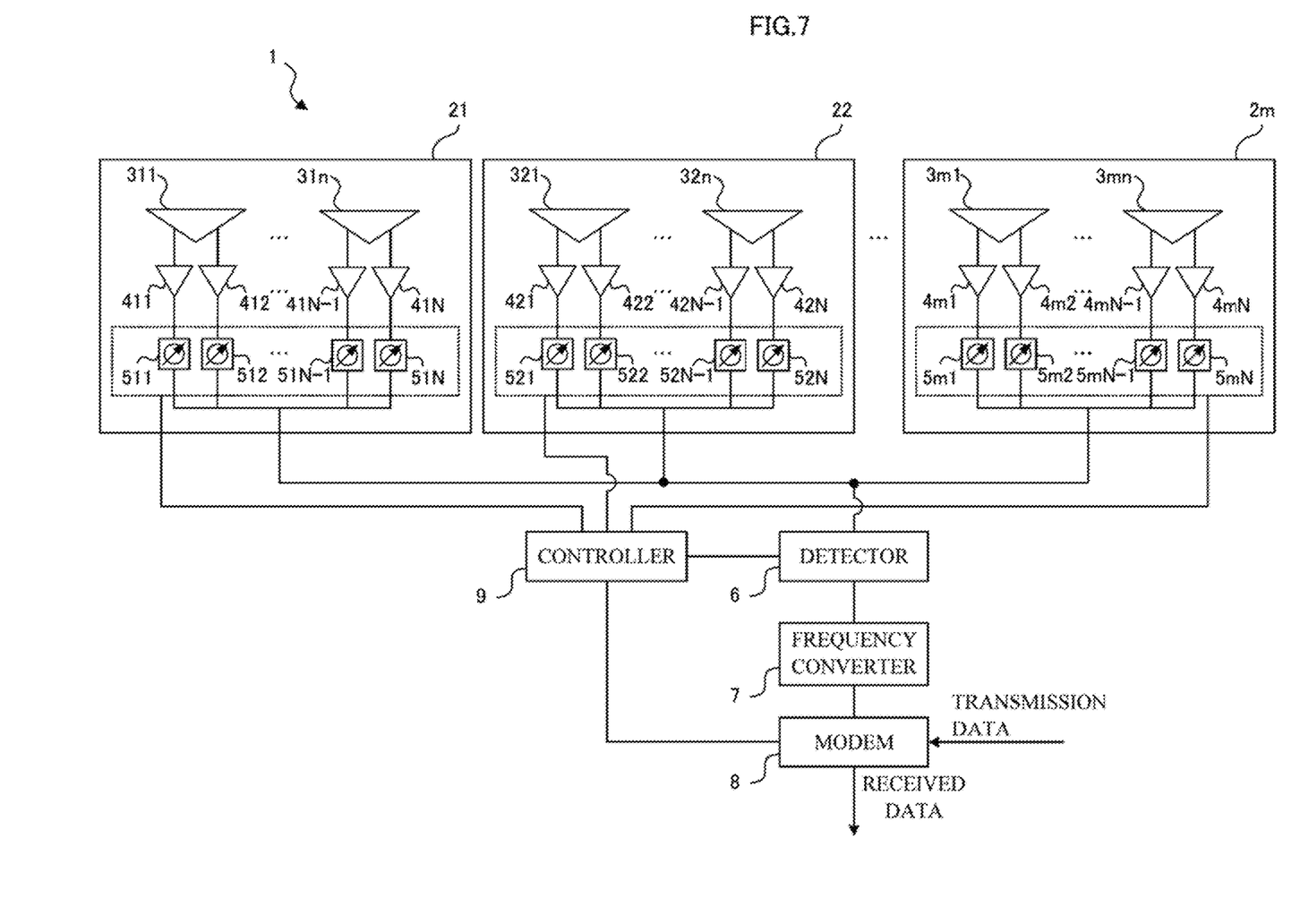
FIG. 7 is a schematic diagram of an example phased array antenna device according to Embodiment 4.

FIG. 7 is a schematic diagram of an example phased array antenna device 1 according to Embodiment 4. A subarray 21 in the phased array antenna device 1 includes n antenna elements 311 to 31n, 2n amplifiers 411, 412 through 41N-1 and 41N, and 2n phase shifters 511, 512 through 51N-1 and 51N. A subarray 22 includes n antenna elements 321 to 32n, 2n amplifiers 421, 422 through 42N-1 and 42N, and 2n phase shifters 521, 522 through 52N-1 and 52N. A subarray 2m includes n antenna elements 3m1 to 3mn, 2n amplifiers 4m1, 4m2 through 4mN-1 and 4mN, and 2n phase shifters 5m1, 5m2 through 5mN-1 and 5mN.

The amplifiers 411, 412 through 41N-1 and 41N, the amplifiers 421, 422 through 42N-1 and 42N, and the amplifiers 4m1, 4m2 through 4mN-1 and 4mN, may hereafter be collectively referred to as amplifiers 4. The phase shifters 511, 512 through 51N-1 and 51N, the phase shifters 521, 522 through 52N-1 and 52N, and the phase shifters 5m1, 5m2 through 5mN-1 and 5mN, may be referred to as phase shifters 5. Each of the antenna elements 3 has two ports connected to two amplifiers 4 and two phase shifters 5. Other components are the same as in Embodiments 1 to 3.

The phased array antenna device 1 operates similarly as in Embodiments 1 to 3 to receive signals from the satellite, to initially set the beam direction, and to correct the beam direction. The phased array antenna device 1 may initially set the polarization plane of each antenna element 3 when initially setting the beam direction.

The operation of the phased array antenna device 1 to align the polarization plane of each antenna element 3 to the polarization plane of the signal from the satellite is described. The detector 6 extracts a signal from the satellite and detects power of the signal. The detector 6 transmits data indicating the detected power value to the controller 9. The controller 9 calculates, based on data indicating the power value of the signal from the satellite received from the detector 6, a polarization-correction phase shift value that corrects deviation of the polarization plane of each antenna element 3 from the polarization plane of the signal from the satellite by being added to the phase shift values of the phase shifters 5 for each antenna element 3 with an array antenna calibration method such as a rotating element electric field vector method. The polarization-correction phase shift value is an example of a correction phase shift value.

With the rotating element electric field vector method, the controller 9 consecutively adds the phase shift values ranging from 0 to 360 degrees to the phase shift values set to the phase shifters 5 for each antenna element 3. The controller 9 consecutively adds the same phase shift value $P_{add}$ ranging from 0 to 360 degrees to the phase shift values set to the two phase shifters 5 included in the antenna element 3 to which the phase shift value is to be added. The controller 9 sequentially performs the process of adding the phase shift value $P_{add}$ on the antenna elements 3. More specifically, while the controller 9 consecutively adds the same phase shift values $P_{add}$ ranging from 0 to 360 degrees to the phase shift values set to the two phase shifters 5 included in one antenna element 3, the controller 9 does not add the phase shift value $P_{add}$ to the phase shift values set to the phase shifters 5 included in other antenna elements 3.

The controller 9 calculates the phase shift value $P_{add}$ that maximizes the power value of the signal from the satellite based on the data indicating the power value of the signal from the satellite detected by the detector 6 while the phase shift values $P_{add}$ ranging from 0 to 360 degrees are consecutively added to the phase shift values of the phase shifters 5 in each antenna element 3. The state in which the power value of the signal from the satellite is maximum is the state in which the polarization plane of the antenna element 3 is aligned with the polarization plane of the signal from the satellite. Thus, the phase shift value $P_{add}$ that maximizes the power value of the signal from the satellite is calculated as the polarization-correction phase shift value that corrects deviation between the polarization plane of each antenna element 3 and the polarization plane of the signal from the satellite by being added to the phase shift values of the phase shifters 5. When the polarization plane of the antenna element 3 is aligned with the polarization plane of the signal from the satellite, the polarization-correction phase shift value is 0.

The controller 9 monitors the C/N ratio in the modem 8, and determines whether the antenna elements 3 receive a signal from the satellite with a C/N ratio that is larger than or equal to a threshold. The C/N ratio may be calculated by the modem 8 or the controller 9. When the antenna elements 3 receive a signal from the satellite with a C/N ratio that is larger than or equal to the threshold, the controller 9 adds the polarization-correction phase shift value to the phase shift values of the phase shifters 5 connected to each antenna element 3. The controller 9 repeats this process in every beam update period to align the polarization planes of all the antenna elements 3 to the polarization plane of the signal from the satellite.

When, for example, a communication target satellite is a stationary satellite without switching to another satellite, and a posture change of the mobile object falls within a range correctable with the direction-correction phase shift value and the polarization-correction phase shift value, the controller 9 may eliminate the process of determining whether the antenna elements 3 receive a signal from the satellite with a C/N ratio that is larger than or equal to a threshold. Other processes are the same as in Embodiments 1 to 3.

As described above, the phased array antenna device 1 for receiving a signal from the satellite according to Embodiment 4 enables stable satellite communications by simply correcting the beam direction to the direction toward the satellite based on the power value of the signal from the satellite and the C/N ratio of the signal from the satellite. Each antenna element 3 has two ports connected to two phase shifters 5, thus enabling tracking of the polarization plane of the signal from the satellite in addition to the direction toward the satellite.

Embodiment 5

As in Embodiment 4, the structure in Embodiment 5 tracks the polarization plane of the signal from the satellite in addition to the direction toward the satellite. In Embodiment 4, the detector 6 extracts the signal from the satellite and detects power of the signal. In Embodiment 5, the detector 6 extracts a signal from the satellite out of the signal with a frequency converted by the frequency converter 7 to the lower frequency, and detects power of the signal.

Figure 8:
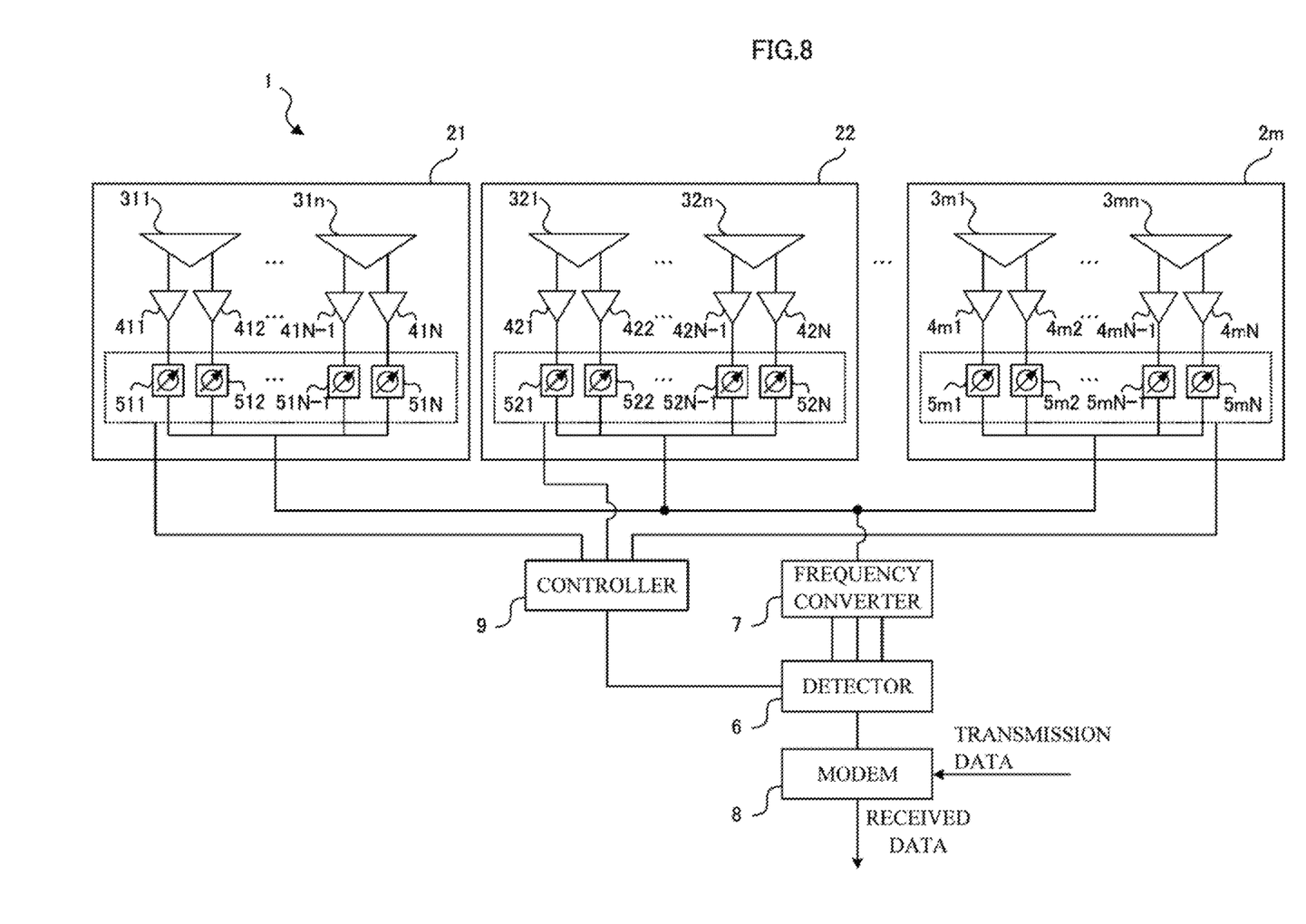
FIG. 8 is a schematic diagram of an example phased array antenna device according to Embodiment 5.

FIG. 8 is a schematic diagram of an example phased array antenna device 1 according to Embodiment 5. The frequency converter 7 converts the frequency of the signal formed by synthesizing signals received by the antenna elements 3 to the lower frequency. The frequency converter 7 converts, for example, an RF signal to an IF signal. The detector 6 extracts a signal from the satellite out of the signals with a frequency converted by the frequency converter 7 to the lower frequency, and detects power of the signal. More specifically, the controller 9 calculates, based on data indicating the power value of the signal from the satellite with a frequency converted to the lower frequency received from the detector 6, the direction-correction phase shift value and the polarization-correction phase shift value with an array antenna calibration method such as a rotating element electric field vector method. Other processes are the same as in Embodiment 4.

As described above, the phased array antenna device 1 for receiving a signal from the satellite according to Embodiment 5 enables stable satellite communications by simply correcting the beam direction to the direction toward the satellite based on the power value of the signal from the satellite and the C/N ratio of the signal from the satellite. Each antenna element 3 has two ports connected to two phase shifters 5, thus enabling tracking of the polarized wave of the satellite in addition to the direction toward the satellite.

Embodiment 6

As in Embodiments 4 and 5, the structure in Embodiment 6 tracks the polarization plane of the signal from the satellite in addition to the direction toward the satellite. In Embodiments 4 and 5, the controller 9 calculates the direction-correction phase shift value for each subarray 2 and the polarization-correction phase shift value for each antenna element 3 based on the power value of the signal from the satellite received from the detector 6. In Embodiment 6, the controller 9 calculates the direction-correction phase shift value for each subarray 2 and the polarization-correction phase shift value for each antenna element 3 based on a change in the C/N ratio in the modem 8.

Figure 9:
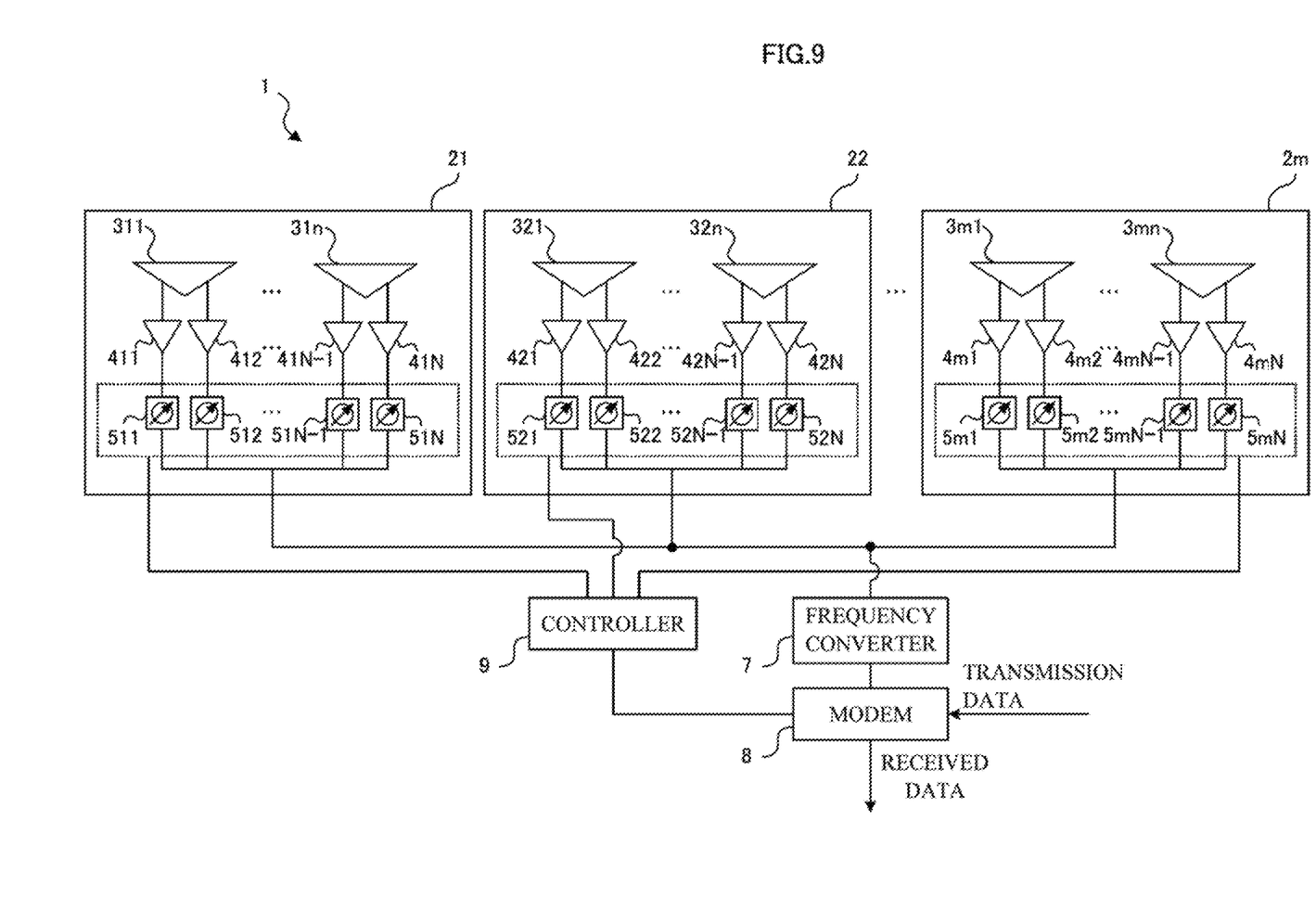
FIG. 9 is a schematic diagram of an example phased array antenna device according to Embodiment 6.

FIG. 9 is a schematic diagram of an example phased array antenna device 1 according to Embodiment 6. The frequency converter 7 converts the frequency of the signal formed by synthesizing the signals from the satellite received by the antenna elements 3 to the lower frequency. The frequency converter 7 converts, for example, an RF signal to an IF signal. The modem 8 demodulates the signal with a frequency converted to the lower frequency by the frequency converter 7, and outputs the demodulated signal. The controller 9 monitors the C/N ratio of the signal from the satellite in the modem 8, and calculates the polarization-correction phase shift value based on the C/N ratio with an array antenna calibration method such as a rotating element electric field vector method.

With the rotating element electric field vector method, the controller 9 monitors the C/N ratio of the signal from the satellite in the modem 8, that is, the quality of the received signal while phase shift values $P_{add}$ ranging from 0 to 360 degrees are consecutively added to the phase shift values of the phase shifters 5 in each subarray 2, and calculates the phase shift value $P_{add}$ that maximizes the C/N ratio. The state in which the C/N ratio of the signal from the satellite is maximum is the state in which the polarization plane of each antenna elements 3 is aligned with the polarization plane of the signal from the satellite. Thus, the phase shift value $P_{add}$ that maximizes the C/N ratio of the signal from the satellite is calculated as the polarization correction phase shift value that corrects deviation between the polarization plane of each antenna element 3 and the polarization plane of the signal from the satellite by being added to the phase shift values of the phase shifters 5. In other words, the phased array antenna device 1 according to Embodiment 6 may eliminate the detector 6. Other processes are the same as in Embodiments 4 and 5.

As described above, the phased array antenna device 1 for receiving a signal from the satellite according to Embodiment 6 enables stable satellite communications by simply correcting the beam direction to the direction toward the satellite based on the power value of the signal from the satellite and the C/N ratio of the signal from the satellite. Each antenna element 3 has two ports connected to two phase shifters 5, thus enabling tracking of the polarized wave of the satellite in addition to the direction toward the satellite. The phased array antenna device 1 that may eliminate the detector 6 can also reduce costs.

In Embodiments 1 to 6, a rotating element electric field vector method is used as an example of the array antenna calibration method, but the method is not limited to this example. For example, an array antenna calibration method described in Oodo and Miura, "A Calibration of Transmitting Array Antennas By Using Synchronous Orthogonal Codes," IEICE technical report A, pp 99-121, RCS99-118, October 1999 may be used.

In each of Embodiments 1 to 6, the phased array antenna device 1 receives signals from the satellite and transmits signals to a satellite. The phased array antenna device 1 may simply receive signals from the satellite. In this structure, the modem 8 may eliminate a modulating function. The frequency converter 7 may eliminate the function of converting the frequency of a signal inputted thereto to a higher frequency. The phased array antenna device 1 may eliminate the amplifiers 4.

In each of Embodiments 1 to 6, the phased array antenna device 1 is mounted on a mobile object. In some embodiments, the phased array antenna device 1 may not be mounted on a mobile object.

Although the C/N ratio is used to evaluate the quality of the received signal, other values may be used for evaluation. The direction correction additional value and the polarization-correction phase shift value added in the above examples may be a negative value. Although the values ranging from 0 to 360 degrees are added, the range of the values may be limited to, for example, 0 to 180 degrees or 0 to −90 degrees. Addition is an example of adjusting the phase shift value, and another method for adjusting the phase shift value may be used. The communication target is not limited to a satellite, and may be any mobile communication target to produce the effects. The phased array antenna device may be stationary.

In each of Embodiments 1 to 6, the processor 91 in the controller 9 executes the satellite tracking program to implement the satellite tracking process with software processing. However, instead of a dedicated system, the satellite tracking process can be implemented with a common computer system. For example, a computer that can implement the satellite tracking process may be formed by distributing the satellite tracking program stored in a non-transitory computer-readable recording medium such as a compact disc read-only memory (CD-ROM) or a digital versatile disc read only-memory (DVD-ROM), and installing this program in the computer. To implement the satellite tracking process by sharing between an operating system (OS) and an application or with the OS and the application in cooperation, the application alone may be stored in a non-transitory recording medium.

The satellite tracking program may also be superimposed on a carrier wave to be provided with a communication network. For example, the satellite tracking program may be posted on a bulletin board system (BBS) on a communication network to be provided with the communication network.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2019-114250, filed on Jun. 20, 2019, the entire disclosure of which is incorporated by reference herein.

REFERENCE SIGNS LIST

1 Phased array antenna device
2, 21 to 2m Subarray
3, 311 to 31n, 321 to 32n, 3m1 to 3mn Antenna element
4, 411 to 41N, 421 to 42N, 4m1 to 4mN Amplifier
5, 511 to 51N, 521 to 52N, 5m1 to 5mN Phase shifter
6 Detector
7 Frequency converter
8 Modem
9 Controller
91 Processor
92 Storage
93 Interface

The invention claimed is:

1. A phased array antenna device for receiving a signal from a satellite, the phased array antenna device comprising:
a plurality of subarrays, each of the plurality of subarrays including a plurality of antenna elements and a plurality of phase shifters, each of the plurality of phase shifters being connected to a corresponding antenna element included in the plurality of antenna elements and being configured to shift phase of signal received by the corresponding antenna element with set phase shift value;
a demodulator to demodulate the signals from the satellite with the phases shifted by the plurality of phase shifters and to output the demodulated signals; and
a controller to set the phase shift values of the plurality of phase shifters and to control a beam direction, wherein
the controller, for each of the plurality of subarrays, (i) calculates a direction-correction phase shift value that maximizes a power value of the signal from the satellite by being added to the phase shift values of the plurality of phase shifters, and (ii) adds the direction-correction phase shift value to the phase shift values of the plurality of phase shifters.

2. The phased array antenna device according to claim 1, wherein
the controller adds, for each of the plurality of subarrays, the direction-correction phase shift value to the phase shift values of the plurality of phase shifters when a quality of the signal from the satellite in the demodulator has an evaluation value that is larger than or equal to a threshold.

3. The phased array antenna device according to claim 1, further comprising:
a frequency converter to convert a frequency of the signal from the satellite to a lower frequency that is lower than the frequency,
wherein the controller calculates, for each of the plurality of subarrays, the direction-correction phase shift value that maximizes, by being added to the phase shift values of the plurality of phase shifters, a power value of the signal with the frequency converted to the lower frequency by the frequency converter.

4. The phased array antenna device according to claim 1, wherein
the controller calculates, for each of the plurality of subarrays, the direction-correction phase shift value that maximizes, by being added to the phase shift values of the plurality of phase shifters, a carrier-to-noise ratio of the signal from the satellite.

5. The phased array antenna device according to claim 1, wherein
each of the plurality of antenna elements includes two ports connected to two phase shifters included in the plurality of phase shifters, and
the controller, for each of the plurality of antenna elements, (i) calculates a polarization-correction phase shift value that maximizes the power value of the signal from the satellite by being added to two phase shift values of the two phase shifters, and (ii) adds the polarization-correction phase shift value to the two phase shift values of the two phase shifters for each of the plurality of antenna elements.

6. The phased array antenna device according to claim 5, further comprising:
a frequency converter to convert a frequency of the signal from the satellite to a lower frequency that is lower than the frequency,
wherein the controller, for each of the plurality of antenna elements, (i) calculates the polarization-correction phase shift value that maximizes, by being added to the two phase shift values of the two phase shifters, a power value of the signal with the frequency converted to the lower frequency by the frequency converter, and (ii) adds the polarization-correction phase shift value to the two phase shift values of the two phase shifters for each of the plurality of antenna elements.

7. The phased array antenna device according to claim 5, wherein
the controller, for each of the plurality of antenna elements, (i) calculates the polarization-correction phase shift value that maximizes, by being added to the two phase shift values of the two phase shifters, a carrier-to-noise ratio of the signal from the satellite, and (ii) adds the polarization-correction phase shift value to the two phase shift values of the two phase shifters for each of the plurality of antenna elements.

8. The phased array antenna device according to claim 5, wherein
the controller adds, for each of the plurality of antenna elements, the polarization-correction phase shift value to the two phase shift values of the two phase shifters when a quality of the signal from the satellite in the demodulator has an evaluation value that is larger than or equal to a threshold.

9. The phased array antenna device according to claim 1, further comprising:
a modulator to modulate a signal to be transmitted and to output the modulated signal,
wherein each of the plurality of subarrays includes a plurality of amplifiers, each of the plurality of amplifiers being connected to a corresponding antenna element included in the plurality of antenna elements,
each of the plurality of phase shifters shifts, with a phase shift value included in the phase shift values and being set to the phase shifter, a phase of the signal modulated by the modulator and distributed to the phase shifter, each of the plurality of amplifiers amplifies the signal with the phase shifted by the corresponding phase shifter and output the amplified signals to the antenna element to which the amplifier is connected, and the plurality of antenna elements radiate the signals inputted thereto into a space with radio waves.

10. The phased array antenna device according to claim 1, wherein the controller performs, by controlling a directing direction of the plurality of antenna elements based on information about an orbit of the satellite, initial tracking to track the satellite and sets, to the plurality of phase shifters, a phase shift value obtained by the initial tracking.

11. A non-transitory recording medium storing a program for causing a computer to control a phased array antenna device for receiving a signal, the program causing the computer to perform operations comprising:

adjusting, for each of a plurality of subarrays including a plurality of phase shifters connected to each of a plurality of antenna elements and being configured to shift a phase of a signal received by the corresponding antenna element with a set phase shift value, a phase shift value of the plurality of phase shifters that is obtained by performing initial tracking to track a satellite by controlling a directing direction of the plurality of antenna elements based on information about an orbit of the satellite, thereby calculating a correction phase shift value that maximizes power of the received signal; and adjusting, for each of the plurality of subarrays, the phase shift values of the plurality of phase shifters with the correction phase shift value.

\* \* \* \* \*